Nov. 10, 1931.     C. S. INGLIS     1,830,945
WINDOW SCREEN FRAMING
Filed July 28, 1931

Inventor.
Clarence S. Inglis,
By
Attorney.

Patented Nov. 10, 1931

1,830,945

UNITED STATES PATENT OFFICE

CLARENCE S. INGLIS, OF GLYNDON, MARYLAND

WINDOW SCREEN FRAMING

Application filed July 28, 1931. Serial No. 553,491.

My invention relates to window or other screen framing. The object is to provide channeled elements, preferably of standard or stock lengths, adapted to be cut as required to form side frame elements, of required dimensions. These elements are preferably formed of thin sheet metal that is relatively soft and easily bent, and also non-corrosive. The metal sheet is bent along its longtudinal middle extension forming thereby a two-ply strip, each ply provided with recesses registering with the recesses of the other ply. The plies are sufficiently separated to provide an opening or channel for the insertion of the wire mesh. Suitable securing elements are provided for insertion through the registering openings and the intervening mesh. The fastener is preferably pointed for facilitating its insertion through the mesh and, after passing through the two recesses, this end is bent or upset for locking it in position.

Suitable corner pieces are provided for securing the adjacent ends of the side frame elements. These corner pieces are preferably made of sheet metal bent along a substantial middle line, thus forming two plies. The plies are sufficiently separated to form a space or opening to receive the corner of the mesh and also the two adjacent ends of the side frame elements. Each ply of the corner piece is provided with recesses registering with the recesses of the other ply for receiving the securing elements.

This invention is an improvement on the invention disclosed in my Patent No. 1,726,703 of Sept. 3, 1929. I have found that with registering recesses, a separate fastening device or pin may be made of different and more suitable material from that of the channeled element, may be made of any desired length without impairing the strength of a ply, and also that when a fastening device or pin becomes defective, it may be replaced by a new one, which was not possible where the tongue formation (as 16, in my said patent) was integral with one of the plies of the strip.

Referring to the drawings which illustrate by way of example a suitable embodiment of my invention—

Similar numerals refer to similar parts throughout the several views.

Figure 1:
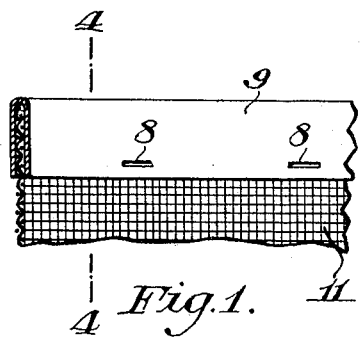
Fig. 1 is a view in perspective of a portion of the channeled side strip element with a portion of wire mesh inserted therein.
Figure 2:
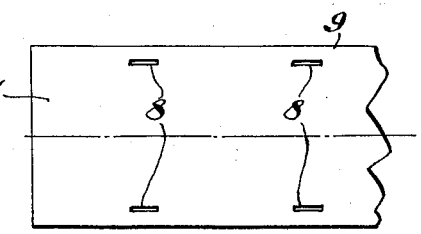
Fig. 2 is a plan view of a portion of the blank, before bending into the shape shown in Fig. 1, but having the recesses made therein.

A flat strip or ribbon 7 of very thin sheet metal is provided with a number of recesses 8. These recesses are preferably elongated and properly spaced in lines parallel with and near the outer margins of the strip, so that, when the strip is folded along its middle line, as shown in Fig. 1, forming a side frame element 9, the recesses of one ply will register with those of the other ply for receiving the fastening pins or elements 10. When the frame element is first formed, as shown in Fig. 1, the plies will be separated to form a channel sufficiently open to facilitate the insertion of the mesh 11 into said channel. After the insertion of the mesh the plies may be brought closer together by pressure, if so desired.

Corner pieces or braces 12 are provided for co-operating with adjacent ends of the side frame elements 9. These corner pieces are formed in a similar way by bending a properly shaped piece of sheet metal along a substantially middle line and providing therein similar registering recesses 8' for similar fastening elements.

It will be understood that the consumer may cut the mesh to the approximate dimensions of the opening to be covered, and that he will also cut the channeled strips, provided with the registering recesses 8, to proper length to make the side frame elements of the screen. When the edges of the mesh are introduced within the channels of the side frame elements, the fastening elements 10 are inserted into one recess 8, through the mesh and through the other registering recess 8, and then bent over or upset to secure the parts together.

The corner pieces or braces 12 are then assembled with the adjacent ends of the side frame elements and secured in place by the fastening elements which are inserted through registering recesses 8' and the intervening mesh, with the free end bent over as described.

Figure 3:
Fig. 3 is a view in perspective of a suitable fastening element upon an enlarged scale.
Figure 4:
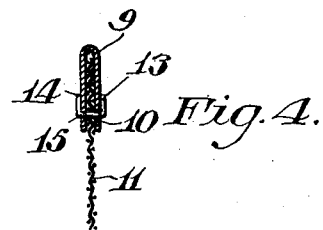
Fig. 4 is a section on line 4, 4 of Fig. 1, with the fastening element in place.
Figure 5:
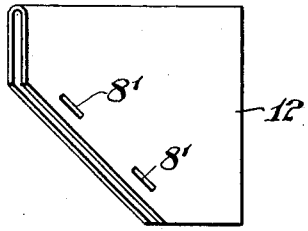
Fig. 5 is a view in perspective of a corner piece.
Figure 6:
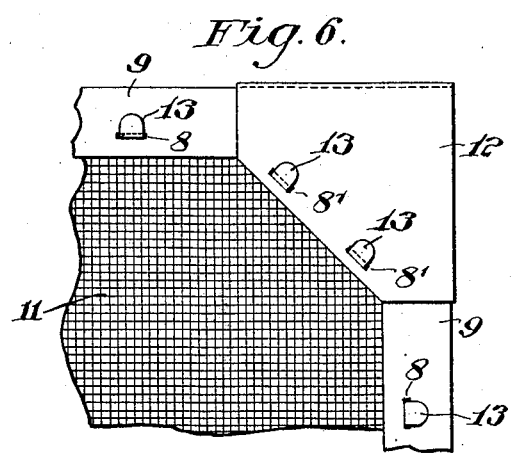
Fig. 6 is a fragmentary plan, showing the assembly of wire mesh, the two-side frame elements and the corner piece.

The slots 8 and 8' are preferably narrow and elongated, as shown, in order to receive, with reasonably close fit, fastening elements 10 made of sheet metal. The fastening elements 10 are preferably provided at one end with the head 13, bent at right angles to its main extension, and at the other end with a pointed formation, as at 14, for facilitating its insertion through the wire mesh. This pointed end after insertion, is adapted to be bent over, along the dotted line 15, shown in Fig. 3, for securely locking the parts together, as shown in Fig. 4.

The ultimate purpose of the invention, therefore is to enable the customer to construct his own screens of any desired size or shape from stock materials, and with no other tools than a hammer and snips.

What I claim is:—

1. The combination of a channeled frame element for wire mesh, comprising a sheet metal strip bent along its middle longitudinal line to form two plies, each ply provided with spaced marginal recesses, the recesses of one ply registering with the recesses of the other ply, said recesses adapted to receive suitable fastening elements, and fastening elements fitting said recesses and adapted to pass therethrough and through the intervening wire mesh and to be secured in such position.

2. The combination of a channeled side frame element for wire mesh, comprising a sheet metal strip bent along its middle longitudinal line to form two plies, each ply provided with spaced elongated marginal recesses, the recesses of one ply registering with the recesses of the other ply, said recesses adapted to receive suitable fastening elements, and fastening elements elongated in cross-section to fit said recesses and adapted to pass therethrough and through the intervening wire mesh and to be secured in such position.

3. The combination of a channeled side frame element for wire mesh, comprising a sheet metal strip bent along its middle longitudinal line to form two plies, each ply provided with spaced marginal recesses, the recesses of one ply registering with the recesses of the other ply, said recesses adapted to receive suitable fastening elements, and fastening elements fitting said recesses and adapted to pass therethrough and through the intervening wire mesh and to be secured in such position, the said fastening elements comprising metal formations each pointed at one end and having a bent-over head portion at the other end to limit its movement through the registering recesses.

4. The combination of channeled side frame elements for wire mesh, comprising sheet metal strips, each bent along its middle longitudinal line to form two plies, thereby providing a channel for receiving the mesh, corner pieces, each comprising a sheet metal blank bent along its middle line to form parallel plies, spaced apart to receive the corner of the mesh and adjacent ends of the side frame elements, each ply provided with recesses registering with the recesses of the other ply, and fastening devices adapted to fit said recesses and to be inserted therein and through the intervening mesh.

5. The combination of channeled side frame elements for wire mesh, comprising sheet metal strips, each bent along its middle longitudinal line to form two plies, thereby providing a channel for receiving the mesh, corner pieces, each comprising a sheet metal blank bent along its middle line to form parallel plies, spaced apart to receive the corner of the mesh and adjacent ends of the side frame elements, each ply provided with recesses registering with the recesses of the other ply, the recesses of each ply arranged diagonally with respect to the side frame elements, and fastening devices adapted to fit said recesses and to be inserted therein and through the intervening mesh.

CLARENCE S. INGLIS.